(12) United States Patent
Hashimoto et al.

(10) Patent No.: US 9,870,326 B2
(45) Date of Patent: Jan. 16, 2018

(54) TRANSFER APPARATUS, TRANSFER SYSTEM, AND NON-TRANSITORY COMPUTER READABLE MEDIUM

(71) Applicant: FUJI XEROX CO., LTD., Tokyo (JP)

(72) Inventors: Takayuki Hashimoto, Kanagawa (JP); Akira Misumi, Kanagawa (JP); Yuichi Sugiyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 345 days.

(21) Appl. No.: 14/840,403

(22) Filed: Aug. 31, 2015

(65) Prior Publication Data
US 2016/0283414 A1  Sep. 29, 2016

(30) Foreign Application Priority Data

Mar. 23, 2015  (JP) ................. 2015-059374

(51) Int. Cl.
*G06F 13/28* (2006.01)
*G06F 13/16* (2006.01)
*G06F 13/40* (2006.01)

(52) U.S. Cl.
CPC ...... *G06F 13/1605* (2013.01); *G06F 13/1668* (2013.01); *G06F 13/4068* (2013.01)

(58) Field of Classification Search
None
See application file for complete search history.

(56) References Cited

U.S. PATENT DOCUMENTS 7,353,301 B2 *  4/2008  Radhakrishnan ... G06F 13/1631
                                                         710/30

FOREIGN PATENT DOCUMENTS

JP  2008-140078 A  6/2008

* cited by examiner

*Primary Examiner* — Idriss N Alrobaye
*Assistant Examiner* — Richard B Franklin
(74) *Attorney, Agent, or Firm* — Sughrue Mion, PLLC (57) ABSTRACT

A transfer apparatus includes first and second communication paths, an accepting unit, a registration unit, an acquisition unit, and a transfer unit. The accepting unit accepts a request for data. The registration unit detects and registers a range that has been specified for writing. The acquisition unit acquires the data from a memory controller via the first communication path in a case where the request is issued for a registered range, and acquires the data from the arbitration device via the second communication path in a case where the request is issued for an unregistered range. The transfer unit transfers the acquired data. In a case where a first range detected from the arbitration device overlaps at least a portion of or is adjacent to a second range, which has been registered, the registration unit combines the first and second ranges into a continuous range and registers the continuous range.

12 Claims, 6 Drawing Sheets

| NUMBER | START POSITION (SP) | AMOUNT OF DATA (SZ) |
|---|---|---|
| 1 | 0x000000 | 0x200000 |
| 2 | 0x200010 | 0x1FFFF0 |
| 3 | 0x300010 | 0x2FFFE0 |
| 4 | 0x600000 | 0x1FFA00000 |
| ⋮ | ⋮ | ⋮ |
| n | ... | ... |

FIG. 3B

| NUMBER | START POSITION (SP) | END POSITION (EP) |
|---|---|---|
| 1 | 0x000000 | 0x200000 |
| 2 | 0x200010 | 0x300000 |
| 3 | 0x300010 | 0x5FFFF0 |
| 4 | 0x600000 | 0x200000000 |
| ⋮ | ⋮ | ⋮ |
| n | ... | ... |

TRANSFER APPARATUS, TRANSFER SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-059374 filed Mar. 23, 2015.

BACKGROUND

Technical Field

The present invention relates to a transfer apparatus, a transfer system, and a non-transitory computer readable medium.

SUMMARY

According to an aspect of the invention, there is provided a transfer apparatus including a first communication path, a second communication path, an accepting unit, a registration unit, an acquisition unit, and a transfer unit. The first communication path communicates with a memory controller that performs reading from and writing to ranges specified in a shared memory. The second communication path communicates with an arbitration device that arbitrates requests between devices, the arbitration device specifying ranges in the shared memory and requesting the memory controller to perform reading from and writing to the ranges in accordance with requests from one or more arithmetic devices. The accepting unit accepts a request for data stored in the shared memory from a request apparatus. The registration unit detects a range from the arbitration device and registers the range, the range having been specified for writing by an arithmetic device among the one or more arithmetic devices. The acquisition unit acquires the data from the memory controller via the first communication path in a case where the request issued from the request apparatus is issued for a registered range, and acquires the data from the arbitration device via the second communication path in a case where the request is issued for an unregistered range. The transfer unit transfers the acquired data to the request apparatus. In a case where a first range detected from the arbitration device overlaps at least a portion of a second range, which has been registered, or is adjacent to the second range, the registration unit combines the first range and the second range into a single continuous range and registers the first range and the second range as the single continuous range.

BRIEF DESCRIPTION OF THE DRAWINGS

An exemplary embodiment of the present invention will be described in detail based on the following figures, wherein.

DETAILED DESCRIPTION

1. Exemplary Embodiment

1-1. Entire Configuration of Transfer System

Figure 1:
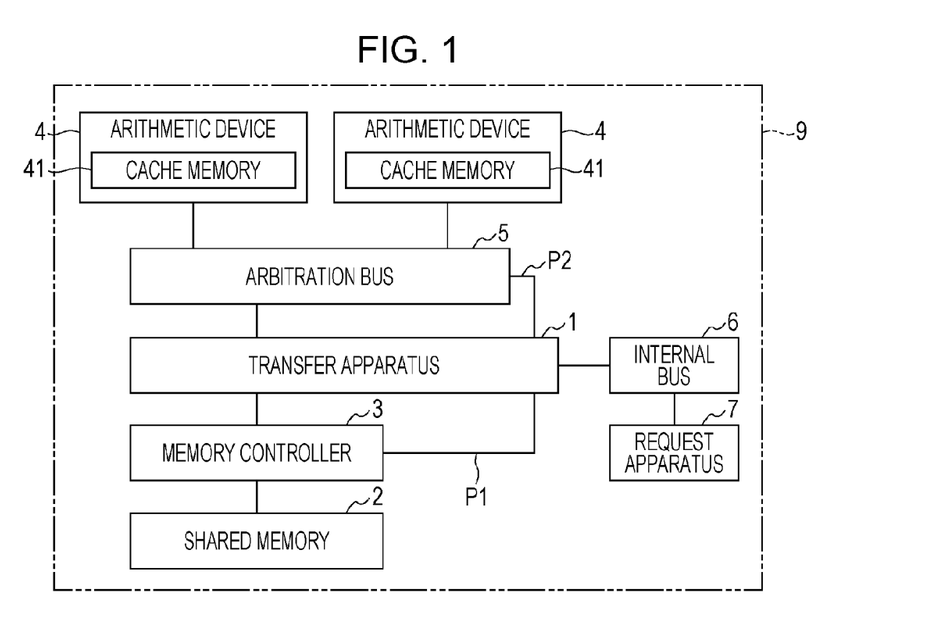
FIG. 1 is a diagram illustrating an entire configuration of a transfer system according to a present exemplary embodiment.

FIG. 1 is a diagram illustrating an entire configuration of a transfer system 9 according to a present exemplary embodiment. As illustrated in FIG. 1, the transfer system 9 includes a transfer apparatus 1, a memory controller 3, an arbitration bus 5, and a request apparatus 7. In addition, the transfer system 9 includes a shared memory 2, one or more arithmetic devices 4, and an internal bus 6.

The memory controller 3 is a controller device that performs reading from and writing to ranges specified in the shared memory 2. The memory controller 3 communicates with the transfer apparatus 1 via a first communication path P1. In addition, the memory controller 3 receives requests for reading and writing from the arbitration bus 5. These requests are monitored by the transfer apparatus 1.

The arbitration bus 5 is called, for example, a cache coherent interconnect (CCI) bus, and serves as a device that arbitrates requests between devices (an arbitration device). The arbitration bus 5 communicates with the transfer apparatus 1 via a second communication path P2, and is a bus that specifies ranges in the shared memory 2 and requests the memory controller 3 to perform reading from and writing to the ranges in accordance with requests issued from the one or more arithmetic devices 4. The arbitration bus 5 operates such that the coherence between data stored in the shared memory 2 and data read out from the shared memory 2 and written into the cache memory 41 of an arithmetic device 4 among the one or more arithmetic devices 4 is maintained.

Since the arbitration bus 5 accepts a request from the transfer apparatus 1 in addition to requests from the one or more arithmetic devices 4, the arbitration bus 5 includes a temporary memory area that stores a queue used to manage these requests. When the processing speed of requests does not keep up with the amount of issued requests, the queue becomes long and it may take a long time until a requested process is performed.

The request apparatus 7 is called, for example, a direct memory access (DMA) device, and is a device that sends, to the transfer apparatus 1, a request for reading out of data stored in the shared memory 2.

The transfer apparatus 1 determines a target from which data is requested (hereinafter referred to as a data request destination) in accordance with the content of a request issued from the request apparatus 7, acquires the data, and transfers the acquired data to the request apparatus 7.

The shared memory 2 is a memory shared by apparatuses that constitute a system, and is a memory from which reading is performed and into which writing is performed by the memory controller 3. The memory capacity of the shared memory 2 is, for example, 8 gigabytes.

The arithmetic devices 4 are devices that specify ranges in the shared memory 2 and requests the memory controller 3 to perform reading from and writing to the ranges through the arbitration bus 5. Two arithmetic devices 4 are illustrated in FIG. 1 and each arithmetic device 4 includes a cache memory 41 as a temporary memory area used for calculation. The memory capacity of the cache memory 41 is, for example, 1 megabyte.

The internal bus 6 is a bus that relays information transmission between the request apparatus 7 and the transfer apparatus 1.

1-2. Configuration of Transfer Apparatus

The transfer apparatus 1 includes a processing unit and a storage device such as a read-only memory (ROM) or a random-access memory (RAM) as appropriate.

Figure 2:
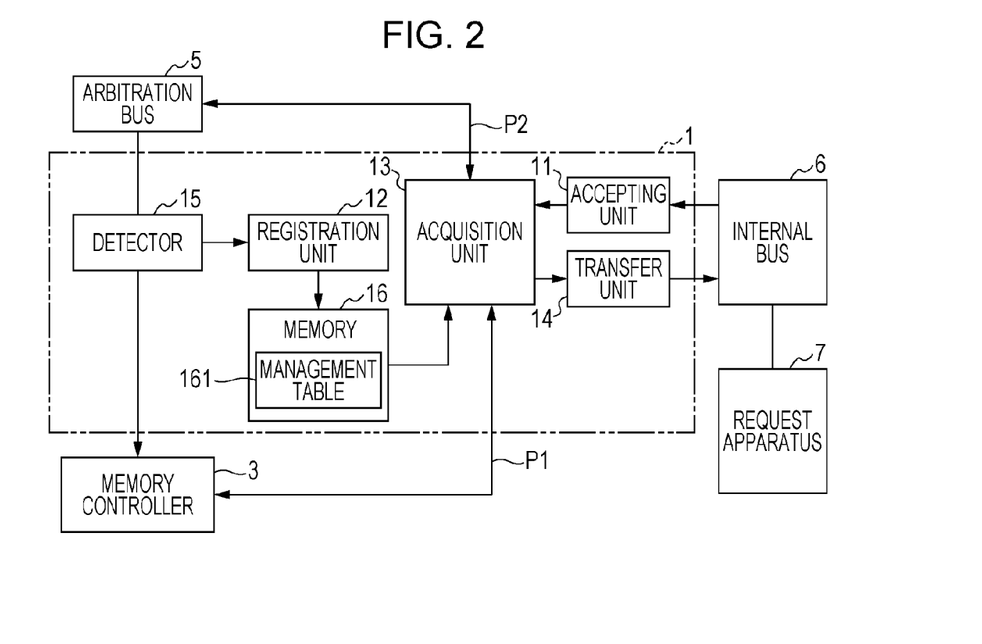
FIG. 2 is a diagram illustrating a functional configuration of a transfer apparatus.

FIG. 2 is a diagram illustrating a functional configuration of the transfer apparatus 1. The transfer apparatus 1 serves as an accepting unit 11, a registration unit 12, an acquisition unit 13, a transfer unit 14, a detector 15, and a memory 16.

The detector 15 monitors requests issued by the arithmetic devices 4 and transferred from the arbitration bus 5 to the memory controller 3, and detect ranges of the shared memory 2 specified for writing by the arithmetic devices 4. The ranges detected by the detector 15 are continuous ranges, and in the case where the arithmetic devices 4 have requested two or more ranges that are not consecutive ranges, the detector 15 detects the two or more ranges as separate ranges.

Note that even in the case where writing of data is performed over plural times, when the range written for each time and the range written before and the range to be written after the range are consecutive ranges, the detector 15 may detect the ranges requested over the plural times as a single continuous range.

The registration unit 12 registers ranges of the shared memory 2 detected by the detector 15 in a management table 161 of the memory 16.

The memory 16 includes a storage device such as the above-described ROM or RAM, and stores the management table 161.

Figure 3A:
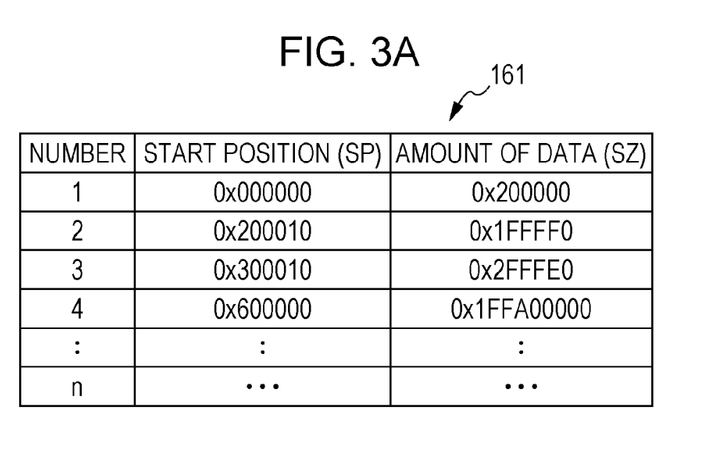
FIGS. 3A and 3B are diagrams illustrating examples of a management table.

FIGS. 3A and 3B are diagrams illustrating examples of the management table 161. The management table 161 is a table in which continuous ranges detected by the detector 15 in the shared memory 2 are stored on a per-range basis. As illustrated in FIG. 3A, each of the continuous ranges in the shared memory 2 is denoted by a unique number, and is described as a record including a start position (SP) and the amount of data (SZ) of the range.

Figure 3B:
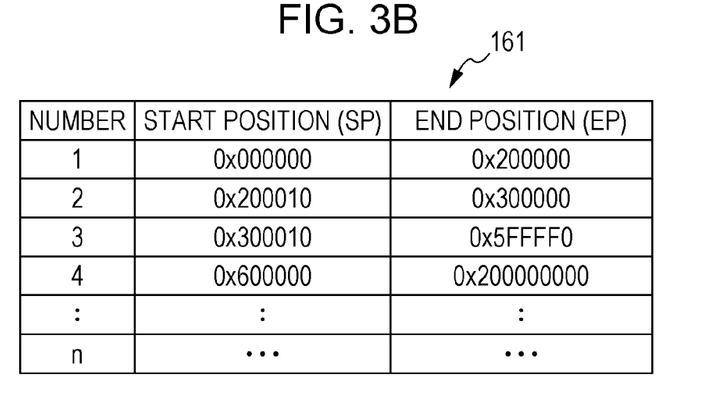

Note that a record indicating a range is not always described using a combination of a start position and the amount of data. For example, as illustrated in FIG. 3B, a record may be described using a combination of a start position (SP) and an end position (EP). In addition, in the following example, the memory 16 prestores a threshold indicating the largest number of records that may be registered in the management table 161.

Figure 4:
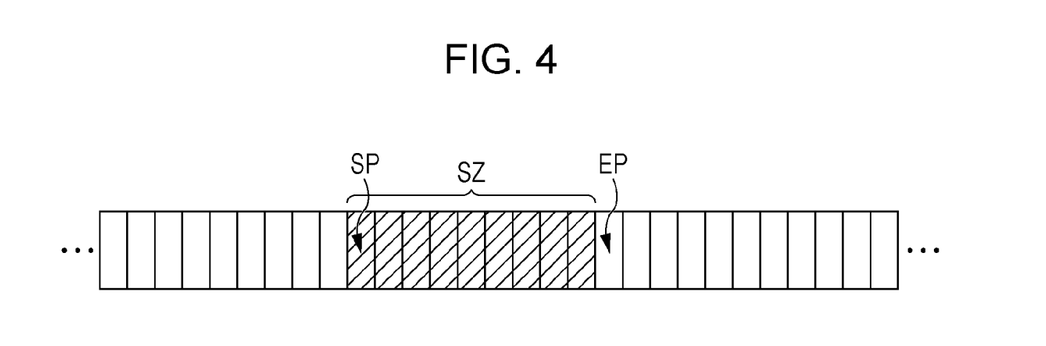
FIG. 4 is a diagram for describing information necessary for determination of a range.

FIG. 4 is a diagram for describing information necessary for determination of a range. A start position SP is information indicating the first address of a certain range. The amount of data SZ is information indicating the size of the range. An end position EP is, for example, information indicating an address obtained by adding the unit of minimum storage to the last address of the range. Here, the unit of minimum storage is the smallest amount of data that may be read or written at a time, and is, for example, 16 bytes.

When any two of the start position SP, the amount of data SZ, and the end position EP are determined, the diagonally shaded range in FIG. 4 is determined.

The accepting unit 11 accepts a request for data stored in the shared memory 2 from the request apparatus 7 via the internal bus 6. Upon accepting the request for the data, the accepting unit 11 sends the request to the acquisition unit 13.

The acquisition unit 13 compares a range accepted by the accepting unit 11 with ranges registered in the management table 161, and determines whether or not the request issued from the request apparatus 7 is issued for a registered range. Then, the acquisition unit 13 selects either of the arbitration bus 5 and the memory controller 3 as a data request destination in accordance with the determination result, and acquires data from the selected data request destination.

In the case where, as a result of the determination, it turns out that the request issued from the request apparatus 7 is issued for a range registered in the management table 161, the acquisition unit 13 acquires data from the memory controller 3 via the first communication path P1. In contrast, in the case where it turns out that the request issued from the request apparatus 7 is issued for a range that is not registered in the management table 161, the acquisition unit 13 acquires data from the arbitration bus 5 via the second communication path P2.

The transfer unit 14 transfers the data acquired by the acquisition unit 13 to the request apparatus 7 via the internal bus 6.

1-3. Operation of Transfer System

Figure 5:
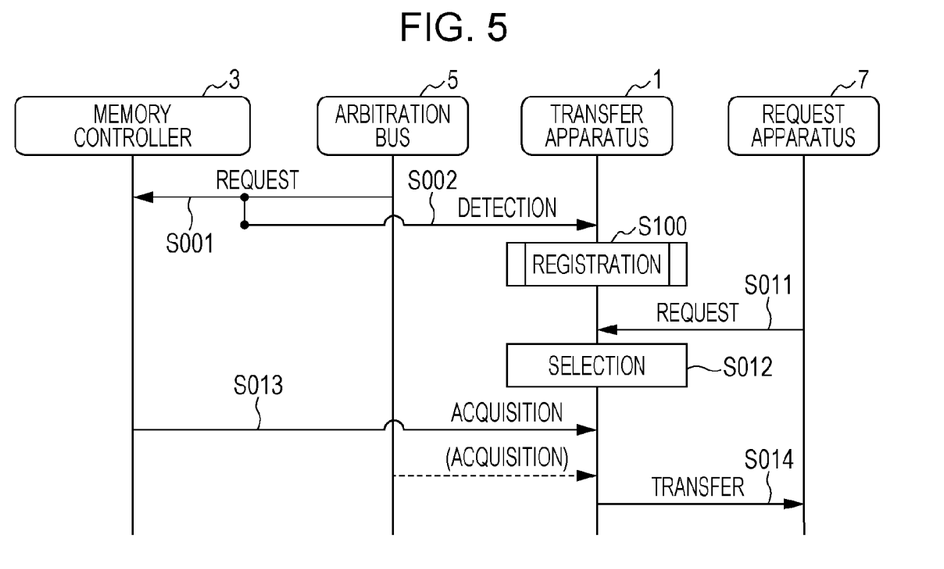
FIG. 5 is a sequence diagram illustrating an operation of the transfer system.

FIG. 5 is a sequence diagram illustrating an operation of the transfer system 9. The transfer apparatus 1 is set so as to acquire a range requested by the request apparatus 7 from the memory controller 3 in an initial state immediately after power is supplied. Then, upon detecting, from the arbitration bus 5, a range specified for reading by a certain arithmetic device 4 for the first time, the transfer apparatus 1 is reset so as to exit the initial state and acquire the range requested by the request apparatus 7 from the arbitration bus 5. When the arithmetic device 4 keeps reading via the arbitration bus 5 and the amount of read-out data exceeds the memory capacity of the cache memory 41, the arithmetic device 4 issues a request to the memory controller 3 via the arbitration bus 5 so as to write, into the shared memory 2, the memory content for which calculation has been completed and that does not have be stored any more, the memory content being stored in the cache memory 41.

The arbitration bus 5, which has received a request from either of the arithmetic devices 4, specifies a range in the shared memory 2 and requests the memory controller 3 to perform reading or writing in accordance with the request (step S001). The transfer apparatus 1 monitors this request issued in step S001. When a request for writing is issued from the arbitration bus 5 to the memory controller 3, the transfer apparatus 1 detects a range indicated by the request and specified in the shared memory 2 (step S002). Then, the transfer apparatus 1 registers the detected range (step S100). This registration process will be described later.

Next, when the request apparatus 7 specifies a certain range in the shared memory 2 and requests the transfer apparatus 1 to read out data (step S011), the transfer apparatus 1 that has received this request selects a data request destination in accordance with the content of this request and the content registered in step S100 (step S012). The transfer apparatus 1 acquires data of the range requested by the request apparatus 7 from either the memory controller 3 or the arbitration bus 5 (from the memory controller 3 in the example illustrated in a solid line in FIG. 5) (step S013). Then, the transfer apparatus 1 transfers the acquired data to the request apparatus 7 (step S014).

1-4. Operation of Transfer Apparatus (1) Operation of Registration Process

Figure 6:
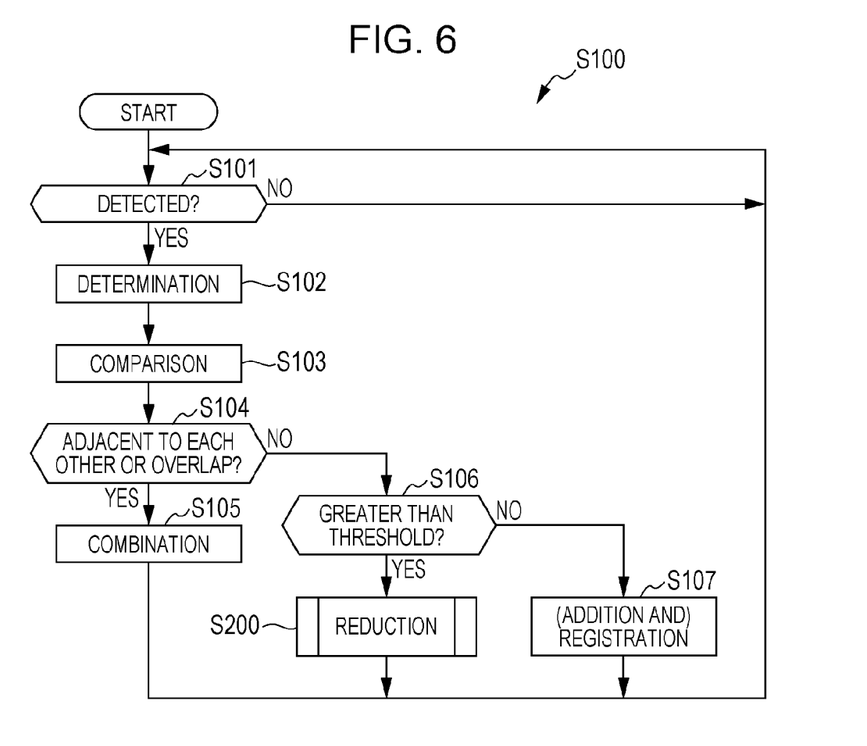
FIG. 6 is a flowchart illustrating an operation of a registration process in the transfer apparatus.

FIG. 6 is a flowchart illustrating an operation of the registration process in the transfer apparatus 1. The transfer apparatus 1 monitors requests issued from the arbitration bus 5 to the memory controller 3 and determines whether or not a range specified for writing by a certain arithmetic device 4 is detected (step S101). In the case where it is determined that the range specified for writing by the arithmetic device 4 is not detected (NO in step S101), the transfer apparatus 1 repeatedly performs such a determination.

In contrast, in the case where it is determined that the above-described range is detected (YES in step S101), the transfer apparatus 1 determines the detected range (step S102). Then, the transfer apparatus 1 compares the determined range with a certain range registered in the management table 161 of the memory 16 (step S103), and determines whether or not these ranges are adjacent to each other or overlap (step S104).

In the case where it is determined that the determined range and the certain range registered in the management table 161 of the memory 16 are adjacent to each other or overlap, that is, in the case where the range detected from the arbitration bus 5 (hereinafter referred to as a first range) overlaps at least a portion of or is adjacent to the certain range registered in the management table 161 (hereinafter referred to as a second range) (YES in step S104), the transfer apparatus 1 combines these ranges into a single continuous range and registers these ranges as the single continuous range (step S105).

Figure 7A:
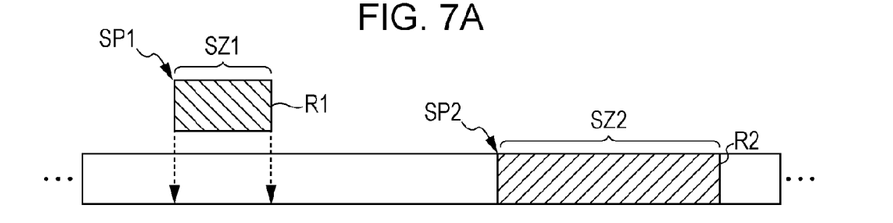
FIGS. 7A and 7B are diagrams illustrating the case where a first range and a second range are not adjacent to each other and do not overlap.
Figure 7B:
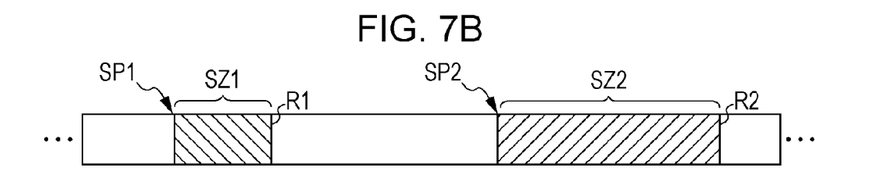

FIGS. 7A and 7B are diagrams illustrating the case where a first range and a second range are not adjacent to each other and do not overlap. A start position SP2 of a second range R2 and the amount of data SZ2 illustrated in FIGS. 7A and 7B are described in the management table 161. Then, in the example illustrated in FIG. 7A, a first range R1 detected from the arbitration bus 5 is apart from the second range R2, and the first range R1 is neither adjacent to nor overlaps the second range R2. Thus, as illustrated in FIG. 7B, as long as the number of registered records does not exceed a threshold, the first range R1 is registered as a region distinguished from the second range R2 in the management table 161.

Figure 8A:
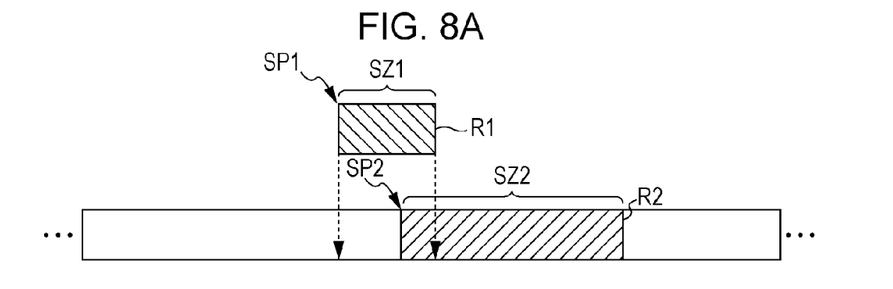
FIGS. 8A to 8C are diagrams illustrating the case where the first range and the second range overlap.
Figure 8B:
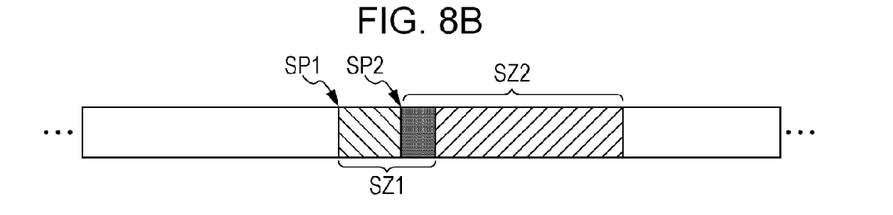

FIGS. 8A to 8C are diagrams illustrating the case where a first range and a second range overlap. As illustrated in FIG. 8A, since the start position SP2 of the second range R2 is positioned inside the first range R1, the first range R1 overlaps the second range R2. The solid filled region illustrated in FIG. 8B is a region in which the first range R1 and the second range R2 overlap.

Figure 8C:
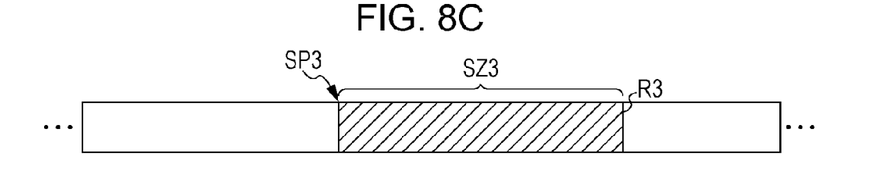

Since there is a region in which the first range R1 and the second range R2 overlap, as illustrated in FIG. 8C, the transfer apparatus 1 combines the first range R1 and the second range R2 into a third range R3, which is a single continuous range, and registers the third range R3 in the management table 161. Thus, in this case, in the management table 161, a record in which SP2 is described in the "start position" field and SZ2 is described in the "amount of data" field is overwritten as a new record in which SP3 indicating a start position of the third range R3 is described in the "start position" field and SZ3 indicating the amount of data of the third range R3 is described in the "amount of data" field.

Note that even when there is no region in which the first range R1 and the second range R2 overlap, in the case where the first range R1 and the second range R2 are adjacent to each other, that is, in the case where no other data is sandwiched between the first range R1 and the second range R2, the transfer apparatus 1 combines the first range R1 and the second range R2 into the third range R3, which is a single continuous range, and registers the third range R3 in the management table 161.

As illustrated in FIG. 6, in the case where it is determined that the first range is not adjacent to the second range and furthermore the first range does not overlap any portion of the second range (NO in step S104), the transfer apparatus 1 determines whether or not the number of records registered in the management table 161 exceeds a predetermined threshold when the first range is newly registered (step S106).

In the case where it is determined that the number of records registered in the management table 161 exceeds the predetermined threshold when the first range is newly registered (YES in step S106), the transfer apparatus 1 performs a reduction process for reducing the number of records registered in the management table 161 (step S200). In contrast, in the case where it is determined that the number of records registered in the management table 161 does not exceed the predetermined threshold (NO in step S106), the transfer apparatus 1 adds and registers the first range to and in the management table 161 (step S107).

(2) Operation of Reduction Process

Figure 9:
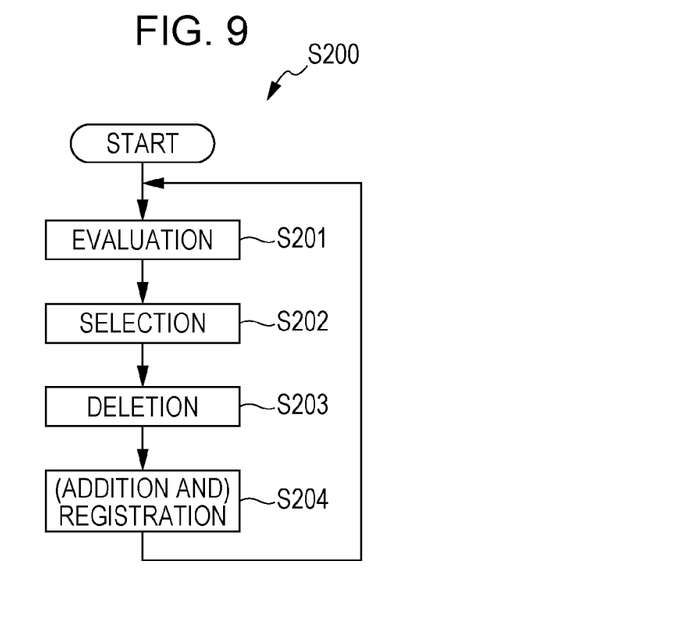
FIG. 9 is a flowchart illustrating an operation of a reduction process.

FIG. 9 is a flowchart illustrating an operation of the above-described reduction process. In step S200, the transfer apparatus 1 performs a predetermined evaluation on each of the ranges registered in the management table 161 (that is, the second ranges), and determines evaluation values based on the evaluations (step S201). Then, the transfer apparatus 1 compares the determined evaluation values with each other, selects the record having the lowest evaluation value from among the records registered in the management table 161 (step S202), and deletes the selected record (step S203).

In this example, an evaluation value is a value based on the amount of data of a range registered in the management table 161. The transfer apparatus 1 evaluates a certain range registered in the management table 161 using the amount of data of the range. The smaller the amount of data is, the lower the evaluation value is assigned. As a result, in the case where the number of ranges registered in the management table 161 exceeds the predetermined threshold, the smallest range is deleted among the ranges. The smaller the range that is deleted, the less likely the range is to be included in the range requested by the request apparatus 7.

After the above-described record has been deleted from the management table 161, the transfer apparatus 1 adds and registers the first range to and in the management table 161 (step S204).

Through the operation described above, the transfer apparatus 1 detects and registers a range specified for writing by the arithmetic device 4. In the case where a request issued from the request apparatus 7 is issued for the range that has already been registered, the transfer apparatus 1 acquires corresponding data from the memory controller 3.

The description, a request issued from the request apparatus 7 for reading is issued for a range specified for writing by the arithmetic device 4, indicates that the data of the range, reading out of which has been requested by the request apparatus 7, has already been written as latest information by the arithmetic device 4. Thus, the transfer apparatus 1 requests the data from the memory controller 3, directly acquires the data from the shared memory 2 in which the latest information is stored, and transfers the acquired data to the request apparatus 7.

In contrast, in the case where a request issued from the request apparatus 7 for reading is not issued for a range specified for writing by the arithmetic device 4, the latest information on the range requested by the request apparatus 7 may still exist in the cache memory 41 of the arithmetic device 4. The transfer apparatus 1 thus acquires the data of the range not from the memory controller 3 but from the arbitration bus 5.

That is, in the case where the latest information on the range requested by the request apparatus 7 may be being processed by the arithmetic device 4, the transfer apparatus 1 according to an exemplary embodiment of the present invention acquires data from the arbitration bus 5 and transfers the data even though it takes time.

Note that when the ranges described in the management table 161 are all combined and become a range corresponding to the entirety of the shared memory 2, for example, the transfer apparatus 1 may set settings such that the memory content of the management table 161 is discarded and the range requested by the request apparatus 7 is acquired from the memory controller 3.

2. Modification

The exemplary embodiment has been described above. The content of the exemplary embodiment may be modified as in the following. In addition, some or all of the following modifications may also be combined.

2-1. Modification 1

In the above-described exemplary embodiment, the transfer apparatus 1 determines whether or not the number of records registered in the management table 161 exceeds the predetermined threshold when a first range is newly registered; however, this determination does not have to be performed. In this case, the maximum number of records registered in the management table 161 may not be limited. For example, requests issued by the arithmetic devices 4 have only to be adjusted such that the number of records registered in the management table 161 does not exceed a certain number.

2-2. Modification 2

In step S201 of the above-described exemplary embodiment, the transfer apparatus 1 performs a predetermined evaluation on each of the second ranges registered in the management table 161, and determines evaluation values based on the evaluations. However, an evaluation value may also be determined for the first range and may be included in targets subjected to comparisons between evaluation values.

In this case, evaluation values are determined for the respective first and second ranges. In the case where the range having the lowest evaluation value is one of the second ranges, the transfer apparatus 1 deletes the second range as described above and newly registers the first range. In contrast, in the case where evaluation values are determined for the respective first and second ranges and the range having the lowest evaluation value is the first range, the transfer apparatus 1 does not newly register the first range.

Figure 10:
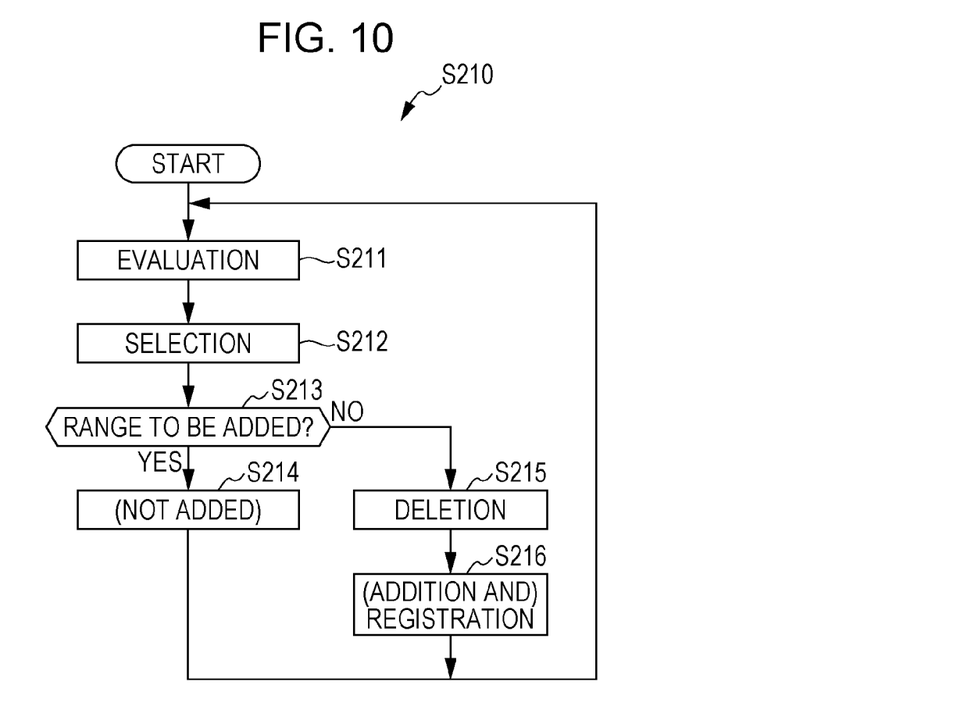
FIG. 10 is a flowchart illustrating an operation of a reduction process in a modification.

FIG. 10 is a flowchart illustrating an operation of a reduction process in this modification. In this modification, the transfer apparatus 1 performs the process illustrated in FIG. 6 except that step S210 illustrated in FIG. 10 is performed instead of step S200.

In step S210, the transfer apparatus 1 performs a predetermined evaluation on each of the first range detected from the arbitration bus 5 and the second ranges registered in the management table 161, and determines evaluation values based on the evaluations (step S211). Then, the transfer apparatus 1 compares the determined evaluation values with each other, and selects the record having the lowest evaluation value from among the records registered in the management table 161 (step S212). The transfer apparatus 1 determines whether or not the selected record is a range planned to be added, that is, a record indicating the first range (step S213). In the case where it is determined that the selected record is the record indicating the first range (YES in step S213), the first range is not added (step S214) and then the process ends.

In contrast, in the case where it is determined that the selected record is not the record indicating the first range (NO in step S213), the transfer apparatus 1 deletes the selected record (step S215).

After the above-described record is deleted from the management table 161, the transfer apparatus 1 adds and registers the first range to and in the management table 161 (step S216).

Through this operation, addition of the first range to the management table 161 is canceled in the case where the record indicating the first range has a lower evaluation value than any of the second ranges.

2-3. Modification 3

In the above-described exemplary embodiment, an evaluation value is a value based on the amount of data of a range registered in the management table 161; however, an evaluation value may also be a value based on another attribute of a range registered in the management table 16. For example, an evaluation value may also be a value based on the shortest distance from a certain range to another range registered in the management table 161. In this case, the longer the shortest distance from the certain range to the other range, the lower the evaluation value of the certain range.

Note that an evaluation value may also be a value based on a detection time period. In this case, for example, the older the detection time period of a certain range is, the lower the evaluation value of the certain range may be.

2-4. Modification 4

In the above-described exemplary embodiment, the detector 15 of the transfer apparatus 1 monitors requests issued by the arithmetic devices 4 and transferred from the arbitration bus 5 to the memory controller 3, and detects ranges of the shared memory 2 specified for writing by the arithmetic devices 4. However, certain ranges of the shared memory 2 specified for reading by the arithmetic devices 4 may also be detected.

In this modification, in the case where a request issued from the request apparatus 7 is issued for a range that is not registered in the management table 161 of the memory 16, the acquisition unit 13 of the transfer apparatus 1 acquires data from the memory controller 3 via the first communication path P1. In contrast, a request issued from the request apparatus 7 is issued for a range registered in the management table 161, the acquisition unit 13 acquires data from the arbitration bus 5 via the second communication path P2.

The description, a request issued from the request apparatus 7 for reading is issued for a range specified for reading by a certain arithmetic device 4, indicates that the data of the range, reading out of which has been requested by the request apparatus 7, has already been read out by the arithmetic device 4 and the data may be updated through calculation in future. Thus, the transfer apparatus 1 requests the data not from the memory controller 3 but from the arbitration bus 5, and causes the arbitration bus 5 to determine a memory area where the latest information on the range is stored. Thereafter, the transfer apparatus 1 acquires data and transfers the acquired data to the request apparatus 7.

In contrast, in the case where a request issued from the request apparatus 7 for reading is not issued for a range specified for reading by a certain arithmetic device 4, the latest information on the range requested by the request apparatus 7 has not yet been read out and written into the cache memory 41 of the arithmetic device 4 and is stored in the shared memory 2. The transfer apparatus 1 thus acquires the data of the range not from the arbitration bus 5 but directly from the memory controller 3.

2-5. Modification 5

In the above-described exemplary embodiment, when the reduction process is performed, the transfer apparatus 1 compares the evaluation values determined for the respective second ranges registered in the management table 161 with each other, and deletes the second range having the lowest evaluation value among the second ranges. However, in the above-described modification 4, the transfer apparatus 1 may select one of the records indicating the second ranges registered in the management table 161 in accordance with the evaluation values, and may combine the selected range and the first range into a single continuous range and re-register the selected range and the first range as the single continuous range.

Figure 11:
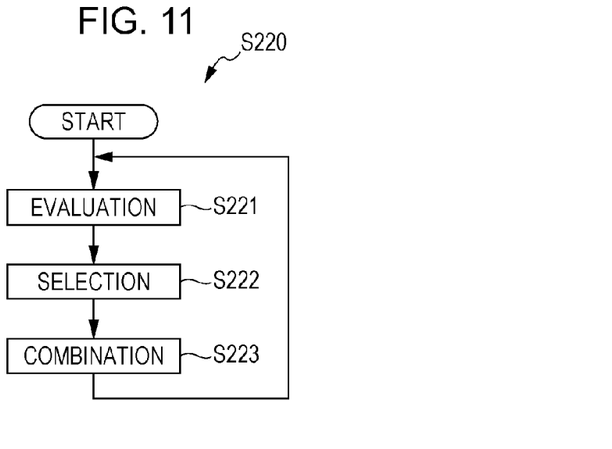
FIG. 11 is a flowchart illustrating an operation of a reduction process in a modification.

FIG. 11 is a flowchart illustrating an operation of a reduction process in this modification. In this modification, the transfer apparatus 1 performs the process illustrated in FIG. 6 except that step S220 illustrated in FIG. 11 is performed instead of step S200.

In step S220, the transfer apparatus 1 performs a predetermined evaluation on each of the second ranges registered in the management table 161, and determines evaluation values based on the evaluations (step S221). Then, the transfer apparatus 1 compares the determined evaluation values with each other, and selects the second range having the lowest evaluation value from among the second ranges registered in the management table 161 (step S222). The transfer apparatus 1 combines the selected second range and the first range detected from the arbitration bus 5 into a single continuous range and registers the selected second range and the first range as the single continuous range (step S223).

Figure 12A:
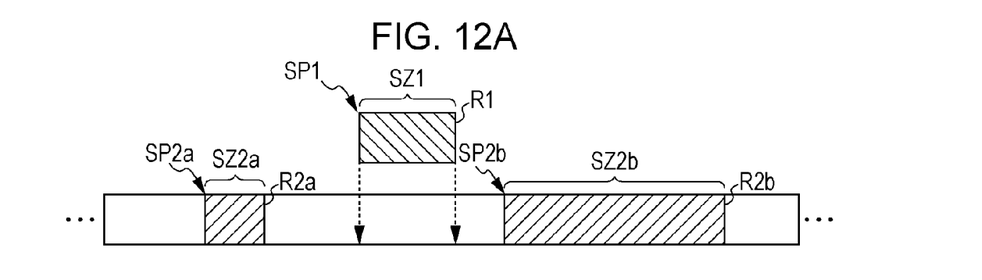
FIGS. 12A to 12C are diagrams illustrating combination in a modification.

An evaluation value of a certain second range may also be, for example, a value based on the distance from the second range to the first range. In this case, the second range having the shortest distance to the first range is selected, the selected second range and the first range are combined, and the selected second range and the first range are newly registered as a single continuous range. FIGS. 12A to 12C are diagrams illustrating combination in this modification. As illustrated in FIG. 12A, upon detection of the first range R1, each of the second ranges R2 described in the management table 161 is evaluated in accordance with the distance to the first range R1.

Figure 12B:
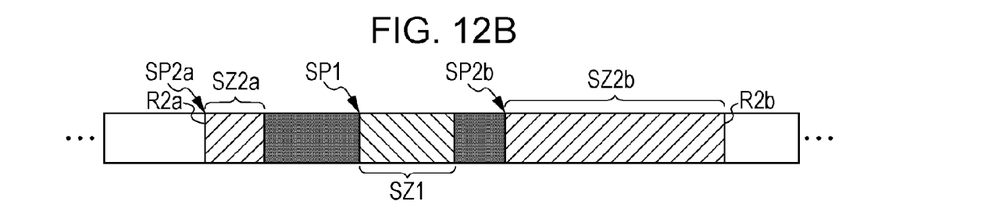

For example, two second ranges R2a and R2b adjacent to the first range R1 are individually evaluated in accordance with the respective distances to the first range R1, the distances being illustrated as solid filled regions in FIG. 12B. In this case, since the distance from the second range R2b to the first range R1 is shorter than the distance from the second range R2a to the first range R1, the second range R2b is selected.

Figure 12C:
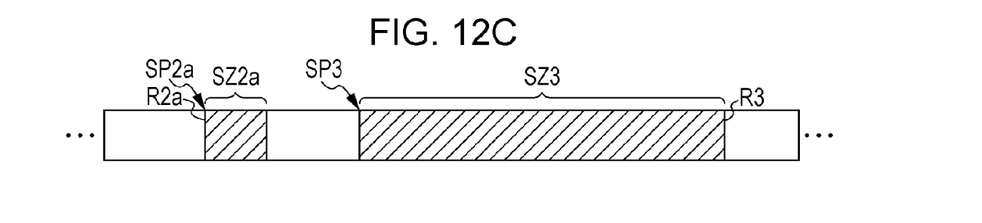

The transfer apparatus 1 combines the first range R1 and the second range R2b, and registers the resulting range as a third range R3, which is a single continuous range illustrated in FIG. 12C, in the management table 161.

In the above-described modification 4, after a certain second range is deleted from the management table 161, there may be the case where the range requested by the request apparatus 7 includes the deleted range. Here, there may be the case where, regarding the range whose data has already been read out from the shared memory 2 and written into the cache memory 41 of a certain arithmetic device 4, the transfer apparatus 1 also acquires data of the range from the memory controller 3, and transfers the acquired data to the request apparatus 7, and where data that is not the latest information is transferred to the request apparatus 7. In contrast, in this modification, since combination is performed without performing deletion of a certain registered range, the transfer apparatus 1 does not transfer data that is not the latest information to the request apparatus 7.

2-6. Modification 6

Targets for which evaluation values are determined are only the second ranges in the above-described modification 5; however, an evaluation value may also be determined for the first range. Then, two ranges are selected from among the first and second ranges in accordance with the evaluation values, and the two selected ranges may be combined and registered. In this case, an evaluation value of a certain range may be a value based on the shortest distance from the certain range to another range.

2-7. Modification 7

The selected one of the second ranges and the first range are combined in the above-described modification 5; however, the first range is registered, and in addition two second ranges may be selected and the two selected second ranges may be combined. That is, the transfer apparatus 1 performs a predetermined evaluation on each of the second ranges registered in the management table 161, and determines evaluation values based on the evaluations. Then, the transfer apparatus 1 may select two of the records indicating the second ranges registered in the management table 161 in accordance with the evaluation values, and may combine the two selected second ranges into a single continuous range and re-register the two selected second ranges as the single continuous range.

In this case, an evaluation value may be a value based on the distance between two second ranges. That is, in the case where the first range detected from the arbitration bus 5 neither overlaps nor is adjacent to any of the plural second ranges registered in the management table 161 and the number of the plural second ranges exceeds a certain threshold, the registration unit 12 registers this first range in the management table 161, and in addition combines two ranges between which the distance is shortest among the plural second ranges into a single continuous range and registers the two ranges as the single continuous range.

2-8. Modification 8

Programs for controlling the transfer apparatus 1 may be provided in a state in which the programs are stored in a computer readable recording medium, example of which include a magnetic recording medium such as a magnetic tape or a magnetic disk, an optical recording medium such as an optical disc, a magneto-optical recording medium, and a semiconductor memory. In addition, these programs may also be downloaded, for example, via the Internet. Note that there may be cases where various apparatuses are applied as the processing unit of the transfer apparatus 1. For example, a dedicated processor or the like is used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transfer apparatus comprising:
a first communication path that communicates with a memory controller that performs reading from and writing to ranges specified in a shared memory;
a second communication path that communicates with an arbitration device that arbitrates requests between devices, the arbitration device specifying ranges in the shared memory and requesting the memory controller to perform reading from and writing to the ranges in accordance with requests from one or more arithmetic devices;
an accepting unit that accepts a request for data stored in the shared memory from a request apparatus;
a registration unit that detects a range from the arbitration device and registers the range, the range having been specified for writing by an arithmetic device among the one or more arithmetic devices;
an acquisition unit that acquires the data from the memory controller via the first communication path in a case where the request issued from the request apparatus is issued for a registered range, and acquires the data from the arbitration device via the second communication path in a case where the request is issued for an unregistered range; and
a transfer unit that transfers the acquired data to the request apparatus,
wherein in a case where a first range detected from the arbitration device overlaps at least a portion of a second range, which has been registered, or is adjacent to the second range, the registration unit combines the first range and the second range into a single continuous range and registers the first range and the second range as the single continuous range.

2. The transfer apparatus according to claim 1, wherein in a case where the first range detected from the arbitration device neither overlaps nor is adjacent to any of a plurality of second ranges, which have been registered, and the number of the plurality of second ranges exceeds a threshold, the registration unit determines, for each of the plurality of second ranges, an evaluation value based on a predetermined evaluation, deletes a certain second range having the lowest evaluation value, and registers the first range.

3. The transfer apparatus according to claim 1, wherein in a case where the first range detected from the arbitration device neither overlaps nor is adjacent to any of a plurality of second ranges, which have been registered, and the number of the plurality of second ranges exceeds a threshold, the registration unit determines, for each of the first range and the plurality of second ranges, an evaluation value based on a predetermined evaluation, and does not register the first range in a case where the evaluation value of the first range is lower than the evaluation values of the plurality of second ranges.

4. The transfer apparatus according to claim 2, wherein, for ranges, which are the plurality of second ranges, the registration unit determines, for each range, a value based on the amount of data indicated by the range to be an evaluation value of the range and determines that the smaller the amount of data, the lower the evaluation value.

5. The transfer apparatus according to claim 3, wherein, for ranges, which are the first range and the plurality of second ranges, the registration unit determines, for each range, a value based on the amount of data indicated by the range to be an evaluation value of the range and determines that the smaller the amount of data, the lower the evaluation value.

6. The transfer apparatus according to claim 2, wherein, for ranges, which are the plurality of second ranges, the registration unit determines, for each range, a value based on the shortest distance from the range to another range to be an evaluation value of the range and determines that the longer the shortest distance, the lower the evaluation value.

7. The transfer apparatus according to claim 3, wherein, for ranges, which are the first range and the plurality of second ranges, the registration unit determines, for each range, a value based on the shortest distance from the range to another range to be an evaluation value of the range and determines that the longer the shortest distance, the lower the evaluation value.

8. A transfer apparatus comprising:
a first communication path that communicates with a memory controller that performs reading from and writing to ranges specified in a shared memory;
a second communication path that communicates with an arbitration device that arbitrates requests between devices, the arbitration device specifying ranges in the shared memory and requesting the memory controller to perform reading from and writing to the ranges in accordance with requests from one or more arithmetic devices;
an accepting unit that accepts a request for data stored in the shared memory from a request apparatus;
a registration unit that detects a range from the arbitration device and registers the range, the range having been specified for reading by an arithmetic device among the one or more arithmetic devices;
an acquisition unit that acquires the data from the memory controller via the first communication path in a case where the request issued from the request apparatus is issued for an unregistered range, and acquires the data from the arbitration device via the second communication path in a case where the request is issued for a registered range; and
a transfer unit that transfers the acquired data to the request apparatus,
wherein in a case where a first range detected from the arbitration device overlaps at least a portion of a second range, which has been registered, or is adjacent to the second range, the registration unit combines the first range and the second range into a single continuous range and registers the first range and the second range as the single continuous range.

9. The transfer apparatus according to claim 8, wherein in a case where the first range detected from the arbitration device neither overlaps nor is adjacent to any of a plurality of second ranges, which have been registered, and the number of the plurality of second ranges exceeds a threshold, the registration unit combines a certain second range closest to the first range in terms of distance among the plurality of second ranges and the first range into a single continuous range and registers the certain second range and the first range as the single continuous range.

10. The transfer apparatus according to claim 8, wherein in a case where the first range detected from the arbitration device neither overlaps nor is adjacent to any of a plurality of second ranges, which have been registered, and the number of the plurality of second ranges exceeds a threshold, the registration unit registers the first range and in addition combines two second ranges between which the distance is shortest among the plurality of second ranges into a single continuous range and registers the two second ranges as the single continuous range.

11. A transfer system comprising:
the transfer apparatus according to claim 1;
a memory controller that communicates with the transfer apparatus via the first communication path and performs reading from and writing to ranges specified in a shared memory;
an arbitration device that arbitrates requests between devices and communicates with the transfer apparatus via the second communication path, the arbitration device specifying ranges in the shared memory and requesting the memory controller to perform reading from and writing to the ranges in accordance with requests from one or more arithmetic devices; and
a request apparatus that sends a request for data stored in the shared memory to the transfer apparatus.

12. A non-transitory computer readable medium storing a program causing a computer to execute a process, the computer including a first communication path that communicates with a memory controller that performs reading from and writing to ranges specified in a shared memory, and a second communication path that communicates with an arbitration device that arbitrates requests between devices, the arbitration device specifying ranges in the shared memory and requesting the memory controller to perform reading from and writing to the ranges in accordance with requests from one or more arithmetic devices, the process comprising:
accepting a request for data stored in the shared memory from a request apparatus;
detecting a range from the arbitration device and registering the range, the range having been specified for writing by an arithmetic device among the one or more arithmetic devices;
acquiring the data from the memory controller via the first communication path in a case where the request issued from the request apparatus is issued for a registered range, and acquires the data from the arbitration device via the second communication path in a case where the request is issued for an unregistered range; and
transferring the acquired data to the request apparatus,
wherein, in the registering, in a case where a first range detected from the arbitration device overlaps at least a portion of a second range, which has been registered, or is adjacent to the second range, the first range and the second range are combined into a single continuous range and the first range and the second range are registered as the single continuous range.

\* \* \* \* \*